(12) United States Patent
Hernier

(10) Patent No.: US 6,837,041 B2
(45) Date of Patent: Jan. 4, 2005

(54) METHOD OF CONVERTING A SOLID NITROGEN-CONTAINING REDUCING AGENT TO THE GAS PHASE FOR USE IN THE REDUCTION OF NITROGEN OXIDES IN EXHAUST GASES

(75) Inventor: Manuel Markus Hernier, Mönchengladbach (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 10/221,024

(22) PCT Filed: Jul. 7, 2001

(86) PCT No.: PCT/EP01/07826
§ 371 (c)(1),
(2), (4) Date: Sep. 9, 2002

(87) PCT Pub. No.: WO02/055180
PCT Pub. Date: Jul. 18, 2002

(65) Prior Publication Data
US 2003/0029164 A1 Feb. 13, 2003

(30) Foreign Application Priority Data
Jan. 13, 2001 (DE) .......................................... 101 01 364

(51) Int. Cl.⁷ ................................................ F01N 3/00
(52) U.S. Cl. .............................. 60/286; 60/274; 60/295; 60/298; 60/301; 60/303
(58) Field of Search ......................... 60/274, 286, 295, 60/298, 300, 297, 301, 303, 320; 423/239.1, 237, 235, 238

(56) References Cited

U.S. PATENT DOCUMENTS

| 5,809,775 | A | * | 9/1998 | Tarabulski et al. ............. 60/274 |
| 6,110,435 | A | | 8/2000 | Lehner et al. |
| 6,301,879 | B1 | * | 10/2001 | Weisweiler et al. ............ 60/274 |
| 6,387,336 | B2 | * | 5/2002 | Marko et al. ................ 423/212 |
| 6,502,390 | B2 | * | 1/2003 | Goerigk et al. ................ 60/286 |

FOREIGN PATENT DOCUMENTS

| EP | 198 45 944 A1 | | 6/1999 | |
| JP | 05-272331 | * | 10/1993 | ................... 60/274 |
| JP | 2002-97935 | * | 4/2002 | ................... 60/286 |
| JP | 2002-155730 | * | 5/2002 | ................... 60/274 |
| WO | 99/49957 | * | 10/1999 | ................... 60/286 |
| WO | WO 00/66252 A1 | | 11/2000 | |

* cited by examiner

Primary Examiner—Binh Q. Tran
(74) Attorney, Agent, or Firm—Vebable LLP; Catherine M. Voorhees

(57) ABSTRACT

The invention relates to a method for producing a gaseous reducing agent for reducing nitrogen oxides in oxygen-containing exhaust gases, especially exhaust gases of internal-combustion engines, the gases being subjected to a selective-catalytic secondary treatment in a catalytic converter, which is characterized by the fact that a solid reducing agent is brought into contact with a liquid heat-carrying agent that has been heated to a temperature in the range of the evaporation temperature of the reducing agent.

19 Claims, 2 Drawing Sheets

Figure 1:
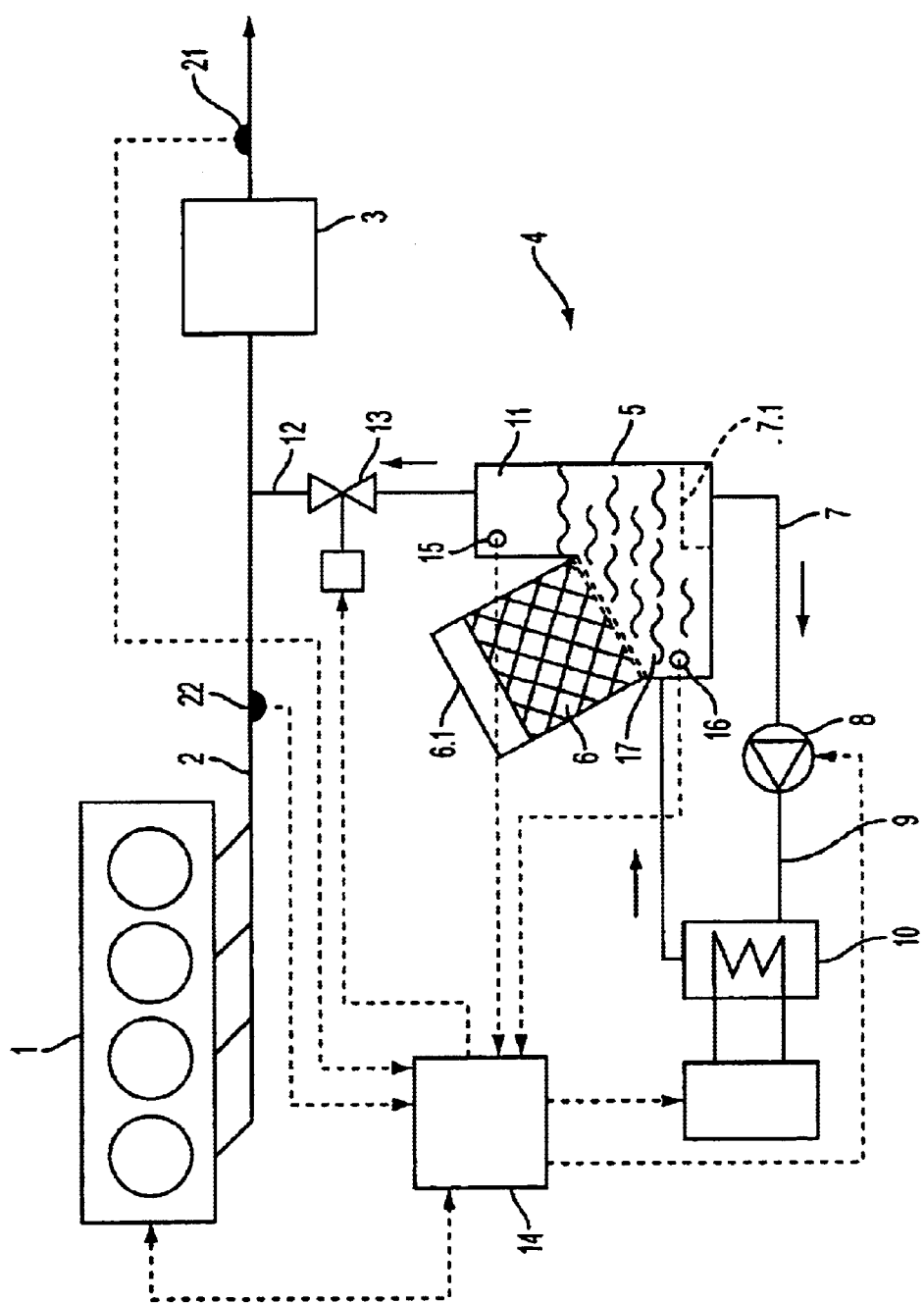

METHOD OF CONVERTING A SOLID NITROGEN-CONTAINING REDUCING AGENT TO THE GAS PHASE FOR USE IN THE REDUCTION OF NITROGEN OXIDES IN EXHAUST GASES

DESCRIPTION

The invention relates to a method for producing a gaseous reducing agent from a reducing agent for reducing nitrogen oxides in oxygen-containing exhaust gases.

The catalytic secondary treatment of oxygen-containing exhaust gases of internal-combustion engines for reducing $No_x$ emissions requires a so-called selective catalytic reduction, which permits the formation of molecular nitrogen ($N_2$), carbon dioxide ($CO_2$) and water in the exhaust gases with the nitrogen oxides, i.e., NO and $NO_2$, both in diesel engines and automobile engines having direct fuel injection. This is effected through the supply of reducing agents, which is difficult with respect to metering the required small quantities in high-dynamic internal-combustion engines in motion with a fluctuating nitrogen oxide emission.

From DE-A-198 45 944, it is known to convert a solid reducing agent into its gaseous form using heat, then to meter the gas into a reaction chamber as a function of the operating requirements, and continue heating it to break it down into its reductive products, which are then added to the exhaust gas to be reduced before the catalytic converter. The advantage of this method is that the solid reducing agent is only subjected to the physical conversion of "solid into gas" due to the temperature influence in the first phase, so the gaseous reducing agent resumes its solid form during the cooling process due to condensation. Only the quantity of the reducing agent that is required to be added subsequently decomposes thermally into its reducing components, which can then become effective in the catalytic reduction.

The decomposition of the gaseous reducing agent into gaseous reductive or reactive components, which is effected in the second stage, cannot be reversed during cooling, however, so following condensation, re-heating leads to evaporation, but the polymerization processes have practically eliminated the reactivity. This known method is especially suited for cyanuric acid and/or melamine and/or urea and/or biuret and/or triuret and/or other nitrogen-containing reducing agents, individually or in mixtures that can decompose into reductive products with a continued supply of energy after the completed phase shift from "solid" to "gaseous."

In the use of solid nitrogen-containing reducing agents that have already decomposed directly into reductive or reactive components during evaporation, especially ammonia ($NH_3$), but also ammonium carbamate, ammonium salts such as ammonium carbonate and ammonium formates or ammonium acetates and ammonium propionates, their low energy requirement for an evaporation makes them potential candidates for this application.

The most significant problem in evaporating these solid reducing agents is that the introduction of thermal energy from the heating device into the solid to be evaporated is difficult because of the level of the evaporation temperature. A particularly pressing problem here is that the evaporation temperature must be set relatively precisely, because when the evaporation temperature is exceeded even slightly, polymerization processes take place in the solids considered to be suitable reducing agents; these polymerized solid components have virtually lost their reactivity in the subsequent conversion into a gas.

The heating of the reductive solid through contact with a solid heat-transfer surface not only results in the unavoidable temperature jump in the gap between two bodies having different temperatures, but also the "thermally insulating" properties of the reactive gas forming at the contact surface between the heating surface and the reductive solid to be heated; these properties necessitate an increased temperature of the heating contact surface. In at least several usable reducing agents, the risk of "overheating" exists, that is, the maximum temperature to be maintained for evaporation is unavoidably exceeded, so the above-described, disadvantageous polymerization processes occur. This is the case both for reducing agents that are evaporated, with the steam subsequently being converted into reactive components through the additional supply of energy, and solid reducing agents in which the heating directly releases reductive components, such as ammonia, by decomposing the solid reducing agent.

It is the object of the invention to provide a method that permits a far more precise control of the temperature and thus produces a significantly better yield of reductive components during the heating of a solid reducing agent.

In a method for producing a gaseous reducing agent for reducing nitrogen oxides in oxygen-containing exhaust gases, especially exhaust gases of internal-combustion engines that are subjected to a selective-catalytic secondary treatment in a catalytic converter, the invention provides that a solid reducing agent is brought into contact with a liquid heat-carrying agent that is heated to a heating temperature in the range of the evaporation temperature of the reducing agent.

In accordance with the invention, the contact between a hot, liquid heat-carrying agent and the solid reducing agent to be evaporated has the advantage of a considerably better contact between the heating medium and the contact surface of the solid material to be heated, and thus a more intensive transfer of the heat to the solid reducing agent, so it is possible to control the temperature far more precisely.

A further advantage is that the liquid heat-carrying agent effects a much faster and easier release of the forming gaseous components from the contact surface, which significantly reduces the "thermally insulating" effect of the gases formed between the liquid heat-carrying agent and the contact surface of the solid reducing agent.

Another advantage of the method according to the invention is that, in the use of a liquid heat-carrying agent, the contact between the hot heat-carrying agent and the solid reducing agent to be gasified can practically be "switched," because the evaporation process is initiated nearly simultaneously with the start of the contact between the heat-carrying agent and the solid reducing agent, and ends when the contact is broken.

In contrast, the use of a solid heating surface is far slower, because the heating surface itself must be heated, and because the unavoidable storage effect of the material of a solid heating surface causes the evaporation process to continue for a specific period of time after the heating energy, e.g., a heating current, has been cut off. This is the case when, due to mechanical measures in addition to turning on and cutting off the heating energy, the reducing agent still present in the form of a pressed body is pressed against the heating surface as the heating energy is initiated, and is withdrawn from the heating surface when the heating energy is cut off. Because of the high equipment outlay for this type of measure, the residual radiation heat cannot be prevented entirely after the pressed body has been raised from the heating surface.

The invention provides the use of a heat-exchange agent whose evaporation temperature is above the heating temperature required for evaporating the reducing agent. This ensures that the heat-carrying agent is always present in liquid form. It is crucial to use a heat-carrying agent in which the reducing agent to be evaporated or gasified is at most slightly soluble. The necessary pairings of reducing agent and heat-carrying agent essentially depend on the reducing agent to be evaporated.

While it is fundamentally possible to create the contact between the reducing agent and the heat-carrying agent by using a flowable reducing agent that is metered into the heat-carrying agent, in an advantageous embodiment of the invention, it is provided that a reducing agent is used as a pressed body whose surface at least partially serves as a contact surface for the hot heat-carrying agent. This greatly simplifies the method, because it is possible to meter the reductive gas to be produced over the period of contact between a predetermined contact surface of the reducing agent present as a pressed body, and in the heat-carrying agent, by selecting the per-time-unit quantity of heat-carrying agent heated to a predetermined temperature, because this allows the quantity of thermal energy supplied per time unit to be preset.

In an embodiment of the invention, it is provided that the hot heat-carrying agent flows around the contact surface of the pressed body. This can be effected, for example, by a flow across the contact surface or through the immersion of the contact surface into an appropriate bath.

In another embodiment of the invention, it is provided that the hot heat-carrying agent is applied to the contact surface in jet form. The advantage of this arrangement is that the jet of hot heat-carrying agent distributed over the contact surface forms a relatively thin film on the contact surface, which transfers its thermal energy to the reducing agent, on the one hand, and immediately allows the formed gas or steam bubbles to pass through, so no throughgoing steam layer can form between the hot heat-carrying agent and the contact surface, on the other hand. In addition, the swirling of the hot heat-carrying agent on the contact surface, which is effected by the flow process, transfers nearly all of the thermal energy contained in the heat-carrying agent to the contact surface.

Instead of applying the heat-carrying agent in a full jet, as described above, it is also possible to apply the agent to the contact surface in a spray jet. As the hot heat-carrying agent impacts the contact surface in droplet form, and at alternating impact points, the resulting gas or steam is reliably carried off practically simultaneously.

In an advantageous embodiment of the invention, it is provided that the produced gaseous reducing agent is held in a gas-collection chamber and metered from this chamber into the exhaust-gas stream to be treated. The presence of a gas-collection chamber further permits solid materials that have condensed out during downtime, but are still insufficiently reactive, to be separated out and removed from the process. This is possible in a particularly simple manner when the walls of the gas-collection chamber are wetted with the heat-carrying agent as a consequence of the evaporation process. The film of heat-carrying agent settling on the walls of the gas-collection chamber prevents condensed-out solid materials from sticking to the walls of the gas-collection chamber.

In one embodiment of the invention, it is provided that a pump conveys the heat-carrying agent past a heater, the contact surface and a collection chamber in a loop. The loop system has the advantage that small quantities of heat-carrying agents can be used. It is advantageous when the loop system includes a bypass in the contact region between the heat-carrying agent and the solid reducing agent, so the heat-carrying agent can also be conveyed through the loop in the heated state if no need presently exists for the gaseous reactive reducing agent. The system must be kept in the ready state, however. Thus, the system is provided with a good control mechanism having a short response time, because the turn-on and shut-off of the bypass respectively permits and prevents contact with the solid reducing agent. Because only a small quantity of the heat-carrying agent is conveyed in the loop, the system consumes less thermal energy during a specified period of readiness.

In a further embodiment of the method according to the invention, it is provided that the conveying output of the pump and/or the heating capacity of the heater and/or the quantity of reduction gas to be metered for the exhaust gas to be purified can be controlled by a control device. A control device of this type, which is preferably integrated into the engine control unit, offers the option of controlling the production and quantity-oriented metering of the gaseous reducing agent as a function of the load and the operating mode, for small quantities of gas as well. The various intervention options, for example with respect to the conveying output of the pump, permit the control of the supply of thermal energy at a certain temperature level of the heat-carrying agent for a required quantity of gas. Through a corresponding change in the heating capacity of the heater, the thermal energy consumed in the evaporation process can be re-used, and during the readiness times, the heating capacity can be set such that only the unavoidable thermal losses of the system are compensated. The actuation of a corresponding metering device, especially a valve at the gas-collection chamber, permits the purification of the quantity of gaseous reducing agent to be metered to the exhaust gas. The opening time of the valve and the detection of the gas pressure in the gas-collection chamber permit a very precise metering. Because the overall system is complex, the individual regulation and control parameters are advantageously linked in the control device, so superposing the various regulation intervention measures results in an optimum quantity metering. Characteristic fields stored in the control device permit an optimization of the process.

In an embodiment of the invention, and for executing the method according to the invention, a device is provided for producing a gaseous reducing agent for reducing nitrogen oxides in oxygen-containing exhaust gases, especially exhaust gases of internal-combustion engines, which are subjected to a selective-catalytic secondary treatment. The device has a pressure-tight sealable receptacle for a solid reducing agent; a pump, which is connected on its suction and pressure sides to the receptacle, and pumps a liquid heat-carrying agent in a loop; a heater, which is associated with the pump, for the heat-carrying agent; elements that bring the hot heat-carrying agent into contact with the solid reducing agent; and a controllable metering valve for introducing the produced gaseous reducing agent into the exhaust-gas stream. The solid reducing agent can be present in pourable form. It is especially advantageous, however, for the agent to be present in the form of a pressed body.

It is advantageous when, according to the invention, the pump and/or the heater and/or the metering valve is or are connected to a control device for controlling the respective outputs, as a function of the respective engine output.

In an embodiment of the invention, it is provided that at least a portion of the pressed-body surface can be immersed in the heat-carrying agent. This arrangement offers the option of providing a bath of the heat-carrying agent in the receptacle, into which the solid reducing-agent body 19 more or less immersed. Consequently, the production of the gaseous reducing agent can be varied over the surface of the reducing-agent body that acts as the contact surface, and is surrounded by the heat-carrying agent. The pump conveys the heat-carrying agent through the loop, past the heater, and into the bath, which allows the heating temperature required for evaporating the used reducing agent to be maintained and, when the reducing agent evaporates, the consumed thermal energy can be redirected into the bath via the heater.

In another advantageous embodiment of the invention, it is provided that a pressure line connects the pump to the receptacle on the pressure side, with the discharge opening of the line being directed at the surface of the pressed body and being embodied as a nozzle. Depending on the embodiment of the nozzle, the pressed-body surface can be acted upon with a full jet or a spray jet of the heat-carrying agent.

In an advantageous embodiment of the invention, it is further provided that the pump is connected on the suction side to a separate collection chamber for the heat-carrying agent, the chamber being associated with the receptacle. This measure allows the liquid heat-carrying agent to be easily separated from the produced gaseous reducing agent. The provision of appropriate built-in structures can prevent drops of the heat-carrying agent from escaping from the receptacle by way of the gaseous reducing agent.

Figure 2:
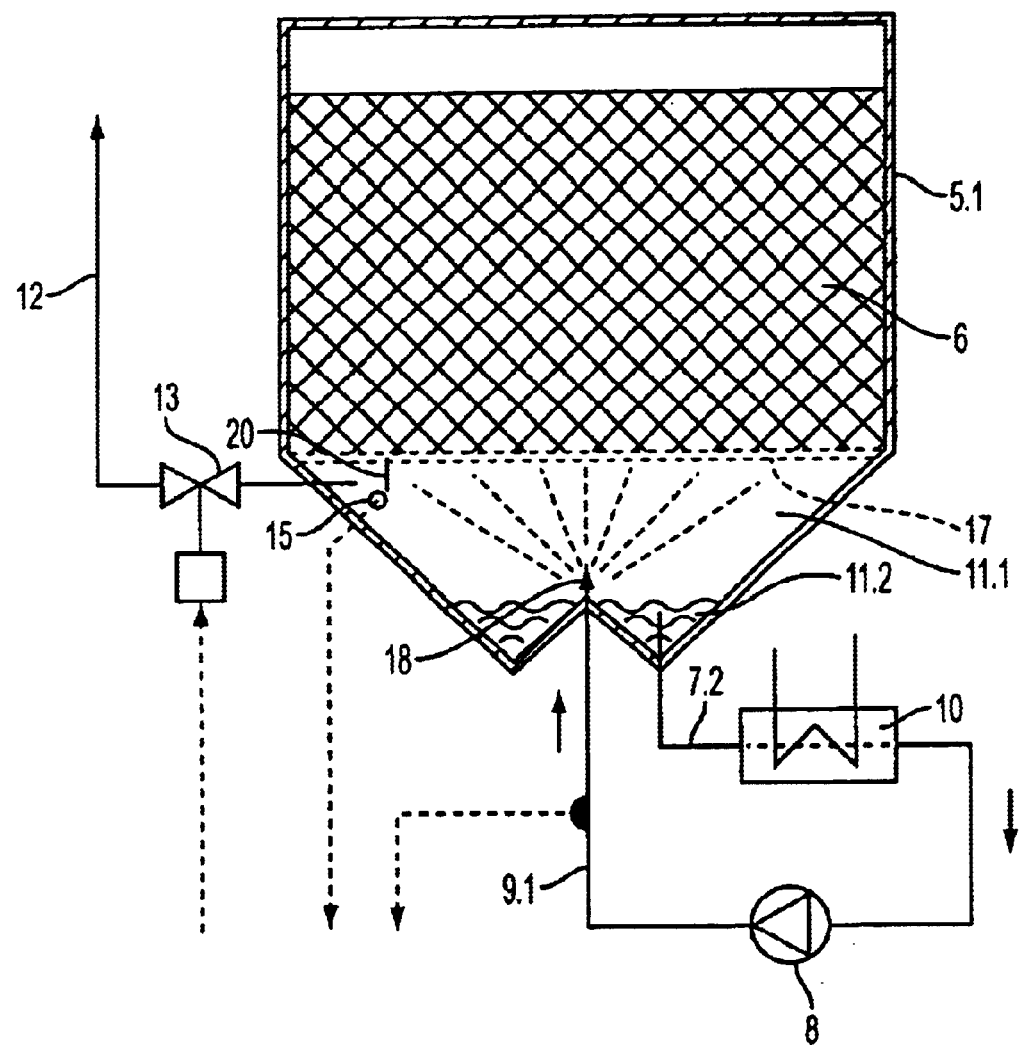

Further features of the invention ensue from the attached schematic drawing and the associated description of exemplary embodiments. The drawings show in;

FIG. 1 a circuit diagram of a piston-type internal-combustion engine having an exhaust-gas purification system that operates in accordance with the principle of selective catalytic reduction; and FIG. 2 an embodiment for evaporation through the application of a jet.

According to FIG. 1, in a piston-type internal-combustion engine, such as a diesel engine or an automobile engine, an exhaust-gas line 2 for oxygen-containing exhaust gases is connected to a catalytic converter 3. The catalytic converter 3 breaks down the nitrogen oxides contained in the exhaust gas, such as NO and $NO_2$, into molecular nitrogen ($N_2$), carbon dioxide ($CO_2$) and water ($H_2O$), according to the principle of selective catalytic reduction, by supplying a nitrogen-containing reducing agent, from which ammonia ($NH_3$) is produced. This reduction in the catalytic converter 3 only requires small quantities, so it must be possible to control the metering quickly in a highly dynamic piston-type internal-combustion engine in motion, with greatly fluctuating load requirements and thus a greatly fluctuating nitrogen oxide output.

In the embodiment illustrated in FIG. 1, a device 4 is provided for producing a gaseous reducing agent from a solid reducing agent, the device having an essentially pressure-tight sealed receptacle 5, into which a pressed body 6 comprising a solid reducing agent is disposed. The receptacle 5 is connected to a pump 8 via a suction line 7; the pressure line 9 of the pump is guided back into the receptacle 5 by way of a heat exchanger provided as a heater 10. The heat exchanger 10 can be heated electrically and/or with exhaust-gas heat.

The pump 8 pumps a liquid heat-carrying agent in a loop. The agent is heated by the heat exchanger 10 and brought into contact with a portion of the surface of the pressed body 6 formed by the reducing agent, the surface acting as a contact surface. An immersion process is only indicated schematically here. The inclined position of the contact surface is beneficial for the escape of the produced gas.

The reducing agent used determines the type of heat-carrying agent. A basic requirement is that the evaporation temperature for the heat-carrying agent must be significantly higher than the evaporation temperature for the reducing agent used. Moreover, the heat-carrying agent must be selected such that the reducing agent used is virtually insoluble therein. This type of "pairing" permits the heat-carrying agent to be heated such that its temperature is only slightly above the necessary evaporation temperature for the reducing agent and, accordingly, the good thermal transfer allows the evaporation to take place within a narrow tolerance field for the temperature to be set, which, for example, prevents a chemical or chemical-physical reaction of the reducing agent at an excessively high temperature, such as a polymerization.

The reducing agent evaporating at the contact surface collects above the liquid level in a gas-collection chamber 11 of the receptacle 5, and from there, it can be metered into the exhaust-gas line 2 via a line 12.

A controllable metering valve that can be actuated by a control device that constitutes a component of the engine control unit 14 effects the metering.

A collection device 7.1, which can retain the detaching solid particles, is disposed upstream of the suction line 7.

A gear pump or a diaphragm pump can be used as the pump 8. Diaphragm pumps are virtually insensitive to solid particles in the liquid to be conveyed.

A pressure sensor 15 detects the pressure in the receiving chamber 11, while a temperature sensor 16 detects the temperature of the liquid heat-exchanger agent. The pressure and temperature information is sent to the control device 14, so the heating device 10 can be actuated with consideration of the temperature, while the metering valve 13 can be correspondingly actuated with consideration of the admission pressure, in order to introduce the necessary quantities of the gaseous reducing agent into the exhaust-gas line 2. The pump 8 can be designed for a constant conveying output, or for a controllable conveying output, so the output of the pump 8 permits the regulation of the quantity of heat, and thus the quantity of produced gas, in addition to the temperature sensing at the heater 10.

The pressed body 6 is held by a screen- or grid-type carrier element 17, which assures direct contact with the liquid heat-carrying agent. The pressed body 6 can sink under the effect of gravity, corresponding to the evaporated quantity at the contact surface. A bypass line, not shown in detail here, and an intermediate container further permit the level of the heat-carrying agent in the receptacle 5 to be dropped, so the contact surface of the pressed body 6 can be released quickly from its contact with the heat-carrying agent, thus ending the production of the gaseous reducing agent while the heat-carrying agent remains hot, and can be "restarted" as needed. It is also possible, however, to raise the pressed body 6 using an appropriate mechanism, thereby breaking the contact with the heat-carrying agent.

The pressed body 6 is advantageously disposed in an independent receptacle 6.1, which is thermally insulated. The advantage of this arrangement is that, in reversible reactions, as may occur, for example, in the decomposition of ammonium carbamate into ammonia and carbon dioxide, a reverse reaction of the gaseous reducing agent components into solid ammonium carbamate may occur during standstill phases. Because the container itself is not heated, it can also be embodied as a quick-change cartridge that can be slipped onto or screwed to the receptacle 5. It is therefore also possible to provide a larger reserve in the form of a cartridge battery, in which case the cartridges can be inserted adjacently or superposed for covering the longest possible operating periods and, reducing the weight of the individual cartridge.

The pressure-regulating circuit represent in FIG. 1 by the pressure sensor 15 and the control device 14 allows a defined overpressure to be maintained in the gas-collection chamber 11. A relative overpressure of, for example, 300 to 500 mbar above the pressure in the exhaust-gas line 2 suffices to permit the gaseous reducing agent to be metered, while simultaneously permitting a corresponding admission pressure to be maintained in the receiving chamber through a corresponding generation of gas as effected by an appropriate control of the quantity flow of the heat-carrying agent.

Whereas, in the embodiment according to FIG. 1, the contact between the reducing agent and the heat-carrying agent is effected through rinsing or immersion, FIG. 2 illustrates a modified embodiment of the receptacle 5.1. In this embodiment, the pressed body 6 can likewise be held on a liquid-permeable carrier element 17 in the form of a screen or the like. The pressure line 9.1 of the pump 8, which is connected to a liquid-collection chamber 11.2 of the receiving chamber 11.1, discharges beneath the screen. In the embodiment illustrated here, the heating device 10 is disposed on the suction side of the pump 8. The liquid-collection chamber 11.2 is embodied as a pump sump. Reducing-agent particles sink to the bottom, and can evaporate, but are not suctioned off.

The pressure-side supply line 9.1 discharges into the receiving chamber 11.1 by way of a nozzle 18, through which the liquid heat-carrying agent is sprayed, in a fanned spray jet or a full jet, onto the surface of the pressed body 6 acting as the contact surface. The produced gas is again drawn off in metered quantities via a line 12 and an upstream metering valve 13 and introduced into the exhaust-gas line 3 of the piston-type internal-combustion engine.

In this embodiment, the heater 10 is disposed on the suction side of the pump, so entrained reducing-agent particles are evaporated before reaching the pump 8, and therefore cannot damage the pump.

If the contact surface of the pressed body 6 is immersed in or surrounded by the heat-carrying agent, as shown in FIG. 1, or if the heat carrying agent is applied to the contact surface of the pressed body 6 in a full or spray jet, as shown in FIG. 2, and internal contact is effected between the heat-carrying agent and the contact surface of the pressed body 6 which permits an especially good thermal transfer and thus successful heating and evaporation of the reducing agent without it being necessary to exceed a permissible upper temperature limit. The fact that a pressed body comprising the reducing agent used here has a poor thermal conductivity is used to advantage: Despite the continuous heating of the contact surface, damaging reactions cannot occur at a short distance from the contact surface in the pressed body.

The use of the reducing agent in the form of a pressed body allows the device to be compact, which is especially desirable for use in motor vehicles. The internal contact between a solid reducing agent and a liquid heat-carrying agent, however, also allows a fine-particle reducing agent in the form of a granulate or powder to be conveyed into a corresponding heat-carrier bath, in which the evaporation process then takes place. This type of device, however, requires a metering supply device for the fine-particle reducing agent.

Both cases further make use of the fact that the heat is practically made available "point-wise," and the evaporation is only effected through the direct contact between the heat-carrying agent and the reducing agent on the contact surface. The container for the reducing agent need not be heated. The gaseous reducing agent can be collected in a gas-collection chamber in the receptacle, in which case it is not necessary to provide a special gas storage container. The "point-wise" heat supply establishes a high steam pressure in the gas-collection chamber, which can also be adjusted through the regulation of the quantity of the liquid heat carrier.

In the case illustrated here, namely the reduction of nitrogen oxides in exhaust gases in piston-type internal-combustion engines, possible reducing agents are nitrogen-containing substances, such as urea, cyanuric acid or melamine. Because the evaporation temperature for these reducing agents must be set very high (cyanuric acid at 327° C.; melamine at 354° C.; urea at 134° C.), it is also possible to use metals having low melting points, such as bismuth, with a melting temperature of 270° C., as heat carriers. Because metals harden as they cool, the above-described immersion process is preferred. Thus, no pump is required, but only a heatable bath into which the pressed body is immersed, or pourable reducing agents are poured.

It is preferable, however, to use solid, nitrogen-containing reducing agents that already decompose directly into reductive components, such as ammonia ($NH_3$), during evaporation at a low evaporation temperature. This is assured with ammonium carbamate, such as ammonium salts, ammonium carbonate, ammonium formates, ammonium acetates and ammonium propionates. Ammonium carbamate, for example, has an evaporation or decomposition temperature of only 60° C. So-called heat-carrier oils can be advantageously used as heat-carrying agents with ammonium salts of this type. The evaporation temperatures in these heat-carrier oils are far above the necessary evaporation temperature of 60° C., so the heat-carrying agent itself does not evaporate at the prescribed temperatures for the heat-carrier oil.

For evaporating ammonium salts, heat-carrier oils on a base of benzyl toluol or dibenzyl toluol, which do not evaporate until heated above 180° C., can be used individually or in mixtures. These oils can also be pumped when cool. As shown in FIG. 2, spraying the heat-carrying agent onto the pressed body 6 is advantageous if the discharge of the line 12 into the receiving chamber 11.1 has an upstream drop separator 20 in the form of a screen or the like; this extensively prevents heat-carrier drops from being carried off via the line 12. Should drops of heat-carrier oil be entrained unexpectedly, however, for example due to a defect in the separator 20, the solid heat carrier comprising hydrocarbons is converted at the catalytic converted into water and carbon dioxide, and thus does not escape into the environment.

A corresponding sensor 21 in the exhaust-gas line 2, behind the catalytic converter 3, can be used to monitor the supply of the gaseous reducing agent. The quantity detected should be "zero," if possible. This can be determined with an ammonia sensor, for example. Furthermore, a nitrogen-oxide sensor 22 in the exhaust-gas line 2, upstream of the catalytic converter 3, can be used to control the quantity of the gaseous reducing agent to be supplied, as a function of the nitrogen oxide content and therefore the load state of the piston-type internal-combustion engine 1. The line 12 and the metering valve 13 are advantageously provided with thermal insulation, and can be heated to prevent the condensation of gaseous reducing agents. In the use of a highly thermally conductive material for the line 12, it is possible to omit a separate heating device, because the waste heat of the exhaust-gas system suffices to prevent condensation during operation.

What is claimed is:

1. A method for producing a gaseous reducing agent for reducing nitrogen oxides in oxygen-containing exhaust gases, especially exhaust gases of internal-combustion engines, the gases being subjected to a selective-catalytic secondary treatment in a catalytic converter, characterized in that a solid reducing agent having a surface, wherein at least a potion of said surface is brought into direct contact with a liquid heat-carrying agent that has been heated to a temperature in the range of the evaporation temperature of the reducing agent prior to said direct contact with said reducing agent.

2. The method according to claim 1, characterized by the use of a heat-carrying agent whose evaporation temperature is higher than the heating temperature required for evaporating the reducing agent.

3. The method according to claim 1, characterized by the use of a heat-carrying agent in which the reducing agent is at most slightly soluble.

4. The method according to claim 1, characterized in that the reducing agent is used as a pressed body whose surface serves, at least in part, as a contact surface for the hot heat-carrying agent.

5. The method according to claim 4, characterized in that the hot heat-carrying agent flows around the contact surface.

6. The method according to claim 4, characterized in that the hot heat-carrying agent is applied to the contact surface in jet form.

7. The method according to claim 4, characterized in that the hot heat-carrying agent is applied to the contact surface in the form of a full jet.

8. The method according to claim 4, characterized in that the hot heat-carrying agent is applied to the contact surface in the form of a spray jet.

9. The method according to claim 1, characterized in that the created gaseous reducing agent is held in a gas-collection chamber, and metered from here into the exhaust-gas stream to be treated.

10. The method according to claim 4, characterized in that a pump conveys the heat-carrying agent in a loop past a heater, the contact surface and a collection chamber.

11. The method according to claim 10, characterized in that a control device controls the conveying output of the pump and/or the heating capacity of the heater and/or the quantity of the reducing agent to be supplied to the exhaust gas.

12. A device for executing the method according to claim 1, said device having a pressure-tight sealable receptacle for a solid reducing agent; a pump, which is connected by its suction side and its pressure side to the receptacle, and which pumps a liquid heat-carrying agent in a loop; a heater, which is associated with the pump, for heating the heat-carrying agent to a temperature in the range of the evaporation temperature of the reducing agent before bringing the hot heat-carrying agent into direct contact with the reducing agent; and a controllable metering valve for introducing the produced gaseous reducing agent into the exhaust-gas stream.

13. The device according to claim 12, characterized in that the pump and/or the heater and/or the metering valve is or are connected to a control device for actuation as a function of the respective engine load.

14. The device according to claim 12, characterized in that at least a portion of the pressed-body surface is arranged so as to be immersed into the heat-carrying agent.

15. The device according to claim 12, characterized in that the pump is connected on its pressure side to the receptacle via a pressure line, whose discharge opening is directed at the pressed-body surface and is embodied as a nozzle.

16. The device according to claim 12, characterized in that, on its suction side, the pump is connected via a suction line to a collection chamber for the heat-carrying agent, the chamber being associated with the receptacle.

17. The device according to claim 12, characterized in that the discharge of the suction line in the collection chamber has associated elements for retaining solid particles.

18. The device according to claim 12, characterized in that the contact surface of the pressed body for the heat-carrying agent has an associated support element that is permeable for the heat-carrying agent.

19. The device according to claim 12, characterized in that the metering valve can be heated.

\* \* \* \* \*